3,463,284
CLUTCH ENGAGED BY BELLOWS
Keith W. Kampert, Libertyville, Ill., assignor to International Harvester Company, Chicago, Ill., a corporation of Delaware
Filed Feb. 27, 1967, Ser. No. 618,672
Int. Cl. F16d *21/08*
U.S. Cl. 192—88                                   1 Claim

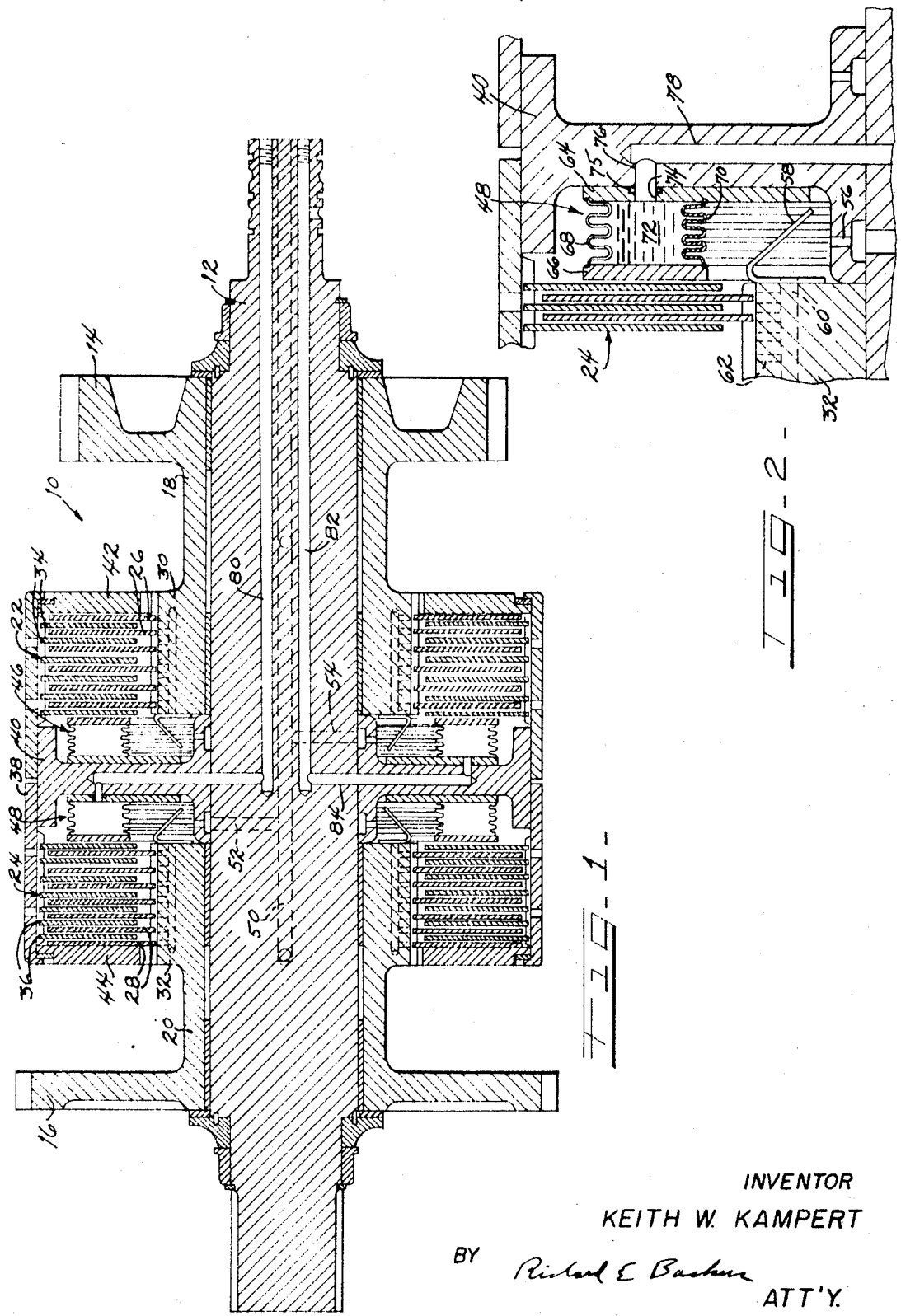

ABSTRACT OF THE DISCLOSURE

A clutch actuator having an annular bellows adapted to extend and retract responsive to control fluid pressure to engage and disengage a clutch pack for selectively connecting and disconnecting a driving member with a driven member. The walls of the bellows are formed of a spring metal material having a corrugated configuration in longitudinal cross section to provide axial resilient flexing to automatically retract the bellows when the fluid pressure is reduced.

Background of the invention

The subject matter of the claimed invention pertains to a clutch actuator for selectively engaging and disengaging clutch packs of the friction disk type. The actuator may be used in either single or double acting clutch designs.

Conventional clutch designs suggest various mechanisms for actuating clutches of the friction disk type. An illustration of one of these designs is found in Patent No. 3,199,648 in which a piston axially slides relative to a reaction member on the drive shaft for engaging the clutch pack responsive to fluid pressure within a cavity formed between the piston and reaction member. This design requires return springs, piston seals, and valving elements which result in a complicated and expensive construction. Other clutch actuators illustrating this general type of construction are shown in Patents No. 3,245,507 and 3,262,531. Each of these designs undesirably incorporate many springs, seals and valves resulting in decreased reliability. The need has been recognized to provide a clutch actuator which is simple in design and compact in construction while providing an efficient and reliable operation.

Summary of the invention

This invention relates to a clutch actuator incorporating an annular bellows having corrugated spring metal walls forming a fluid cavity and adapted to expand under control fluid pressure to engage a clutch pack while automatically retracting to disengage the clutch upon release of the fluid pressure. The design of the present invention is simplified in that separate return springs are eliminated since the spring metal walls themselves operate to release the clutch actuator. Furthermore, since the bellows defines a fluid tight cavity the need for expensive sealing elements is obviated. The clutch actuator of the present invention may also be readily utilized with existing clutch pack assemblies.

Description of the drawing

FIGURE 1 is a cross sectional view of a clutch assembly incorporating a clutch actuator embodying features of the present invention;

FIGURE 2 is a cross sectional view of a portion of the clutch assembly of FIG. 1 illustrating details of the clutch actuator.

Description of the preferred embodiment

Referring to the drawings FIGURE 1 illustrates generally at 10 a clutch assembly according to the present invention. Clutch assembly 10 affords selective engagement and disengagement of driving member, or drive shaft 12, with either of the driven members, or spur gears, 14 and 16. The driven members are connected in a conventional manner with a suitable drive train or transmission (not shown). Each of the gears 14 and 16 are integral with a respective quill shaft 18 and 20 which in turn are journalled for rotation about drive shaft 12.

Clutch assembly 10 is double acting in design and incorporates a pair of clutch packs 22 and 24. Each of the clutch packs is conventional and comprises a plurality of interleaved friction disks. The plurality of disks 26 and 28 are splined for axial sliding movement relative to flanges 30 and 32 on the quill shafts. Similarly, the plurality of disks 34 and 36 are splined for axial sliding movement relative to clutch housing 38. Housing 38 is secured for rotation with reaction disk 40 which in turn is secured for rotation with drive shaft 12. End plates 42 and 44 are secured for rotation with respective ends of housing 38 and function to retain the clutch packs within the clutch assembly.

Selective engagement and disengagement of either clutch pack is accomplished through operation of a selected one of the clutch actuators 46 and 48. As will presently be described the clutch actuators are adapted to axially extend and retract under operator control. Upon extension of either actuator the clutch disks of the respective clutch pack will be forced together in a conventional manner.

Lubrication of the clutch disks is achieved through oil which is fed through axial bore 50 and radial feed bores 52 and 54 which in turn deliver oil to the apertures 56 formed in a groove at the base of the reaction disk (FIGURE 2). The effect of centrifugal force will direct oil droplets from the apertures against annular oil slinger 58 which will feed the oil to a plurality of axial manifold bores 60 formed in flange 32. The oil is distributed onto the clutch disks through a series of apertures 62 leading outwardly from the manifold bores.

Details of actuator 48 are illustrated in FIGURE 2. The actuator comprises an annular bellows preferably having a base plate 64 and an actutor plate 66 secured together by means of a pair of concentric flexible wlls 68 and 70. Base plate 64 is secured to reaction disk 40 by suitable means such as welding or by bolts. As an alternative construction the walls 68 and 70 may be secured directly to disk 40, thus eliminating plate 64.

Each of the walls 68 and 70 is formed with a corrugated configuration in longitudinal cross section. This configuration permits axial flexing so that the actuator may be extended and retracted. The walls 68 and 70 are composed of a high-strength material, such as spring steel, affording resilient deflection. These walls are secured to plate 64 and 66 by suitable means such as brazing. The walls and plates thus form an annular cavity 72 in which hydraulic fluid is confined. The cavity communicates with aperature 74 in base plate 64 and with bores 76 and 78 formed in the reaction disk. O-ring seal 75 may be provided to insure against fluid leakage between plate 64 and disk 40. Bore 78 in turn communicates with axial bore 80 formed in the drive shaft (FIGURE 1). Bore 80 is connected with a conventional control system comprising an hydraulic control valve and fluid presure source (not shown) adapted to vary the fluid pressure in cavity 72. Thus, increased pressure from the control system will be communicated to cavity 72 to extend clutch actuator 48 for engagement of clutch pack 24. To disengage the clutch pack the control system is manipulated to reduce the fluid pressure in the cavity. The resiliency of the metal in the walls 68 and 70 will act as a spring to automatically retract actuator plate 66 and force fluid from the cavity.

The construction and operation of clutch actuator 46 is identical to that described above for actuator 48. Control pressure from the control system is delivered to the actuator through axial bore 82 and radial bore 84.

It is apparent from the foregoing description that applicant has provided a novel clutch actuator affording a simplified design eliminating the need for separate return springs. The design removes the requirement for valves of any type in the clutch assembly itself. Moreover, the need for expensive sealing elements is obviated.

What is claimed is:

1. A clutch actuator assembly for use in a power transmitting clutch having driving and driven members, and at least one clutch pack for selectively engaging and disengaging the driven member for rotation with the driving member, the assembly comprising the combination of: a clutch actuator mounted between the clutch pack and the reaction member, the actuator including an annular bellows having an actuator plate adapted to contact the clutch pack, a baseplate secured to the reaction member, and inner and outer concentric walls secured between the baseplate and the actuator plate forming an annular cavity therewith for receiving hydraulic fluid under pressure, each wall having corrugations and being adapted for axial resilient deflecting affording extension and retraction of the bellows, the outer wall having fewer corrugations than the inner wall for uniform deflection of both walls; control means including a fluid passageway for directing fluid pressure to and venting fluid pressure from said cavity for respectively extending the bellows to engage the clutch pack and retracting the bellows to disengage the clutch pack; and seal means interposed between the baseplate and the reaction member and encircling said passageway.

References Cited

UNITED STATES PATENTS

| 1,157,793 | 10/1915 | Metten. |
| 1,748,827 | 2/1930 | Boltshauser. |
| 2,163,202 | 6/1939 | Kegresse. |
| 2,183,761 | 12/1939 | Aspinwall et al. |
| 2,408,327 | 9/1946 | McLean. |
| 2,737,834 | 3/1956 | Coughlin _____ 192—88 XR |

FOREIGN PATENTS 261,374   6/1913   Germany.

BENJAMIN W. WYCHE III, Primary Examiner

U.S. Cl. X.R.

92—35; 192—87.15